United States Patent [19]
Westwick et al.

[11] Patent Number: 5,828,836
[45] Date of Patent: Oct. 27, 1998

[54] NETWORKED INFORMATION COMMUNICATION SYSTEM

[75] Inventors: George E. Westwick; Mahesh Bhuta, both of Boca Raton, Fla.

[73] Assignee: International Business Machines Corporation, Research Triangle Park, N.C.

[21] Appl. No.: 783,685

[22] Filed: Jan. 15, 1997

Related U.S. Application Data

[63] Continuation of Ser. No. 577,302, Dec. 22, 1995, abandoned, which is a continuation of Ser. No. 134,160, Oct. 8, 1993, abandoned.

[51] Int. Cl.⁶ .................................................. G06F 13/00
[52] U.S. Cl. .................................... 395/200.3; 395/200.31; 395/200.63; 395/200.68; 395/200.81; 395/828
[58] Field of Search .......................... 395/200.81, 200.03, 395/200.63, 200.68, 200.31, 828

[56] References Cited

U.S. PATENT DOCUMENTS

| | | | |
|---|---|---|---|
| 4,752,765 | 6/1988 | Larson | 340/347 |
| 4,763,357 | 8/1988 | Barr | 380/48 |
| 4,881,075 | 11/1989 | Weng | 341/87 |
| 4,903,018 | 2/1990 | Wiebach et al. | 341/51 |
| 4,906,991 | 3/1990 | Fiala et al. | 341/51 |
| 4,918,722 | 4/1990 | Duehren et al. | 379/100 |
| 4,941,170 | 7/1990 | Herbst | 379/100 |
| 4,969,184 | 11/1990 | Gordon et al. | 379/100 |
| 4,972,499 | 11/1990 | Kurosawa | 382/38 |
| 4,994,926 | 2/1991 | Gordon et al. | 358/400 |
| 5,003,583 | 3/1991 | Iggulden | 379/100 |
| 5,008,926 | 4/1991 | Misholi | 379/89 |
| 5,014,300 | 5/1991 | Harvath et al. | 379/100 |
| 5,072,309 | 12/1991 | Brown | 358/434 |
| 5,170,266 | 12/1992 | Marsh et al. | 358/468 |
| 5,317,568 | 5/1994 | Bixby et al. | 370/85.6 |
| 5,323,450 | 6/1994 | Goldhage et al. | 379/100 |
| 5,333,266 | 7/1994 | Boaz et al. | 395/200 |
| 5,339,156 | 8/1994 | Ishii | 358/402 |
| 5,339,174 | 8/1994 | Harris | 358/442 |
| 5,367,564 | 11/1994 | Sutoh et al. | 379/100 |
| 5,377,191 | 12/1994 | Farrill et al. | 370/94.1 |
| 5,384,835 | 1/1995 | Wheeler et al. | 379/96 |
| 5,459,584 | 10/1995 | Gordon et al. | 358/434 |

*Primary Examiner*—Alyssa H. Bowler
*Assistant Examiner*—Dzung Nguyen
*Attorney, Agent, or Firm*—Calfee, Halter & Griswold LLP

[57] ABSTRACT

A data management system and a method of distributing information units within the system is provided. The system comprises a host processor and plurality of controllers connected to the host processors in a local area network configuration. Each of the plurality of controllers provides access to any user, and each is provided with data storage capacity in the form of local storage in which information units are stored. The host processor manages all information units and their movement within the system. The host processor maintains a directory of all information units stored in the controllers in the system, allowing it to route a particular information unit to a controller for delivery to one or more users at a predetermined time.

17 Claims, 2 Drawing Sheets

NETWORKED INFORMATION COMMUNICATION SYSTEM

This is a continuation of application Ser. No. 08/577,302, filed Dec. 22, 1995 now abandoned, which is a continuation of Ser. No. 08/134,160, filed Oct. 8, 1993 now abandoned.

BACKGROUND OF THE INVENTION

Networked data processing systems are typically being used today for providing a means of multimedia (voice, image, video, etc.) communications between users. A typical network includes a host processor and a number of local controllers. The local controllers are used to provide user access to the system. Usually the local controllers are connected to a public telephone network, allowing users to access the system via any device capable of connecting to the public telephone system such as a telephone, facsimile machine or personal computer. The local controllers communicate with and are connected to the host processor via a local area network (LAN) such as a token ring. Typical services provided by these systems are facsimile document transmission and storage, digitized voice transmission and storage and full and still-motion video transmission and storage.

Users typically access the system by calling a telephone number provided to them by a service provider. This telephone number will connect the user to one of the local controllers. Because the users typically access the network only when they need to transmit or receive data, they are constantly connecting to and disconnecting from the system via the controllers. The controllers pass all information received from the user to the host processor, including both control information and multimedia data.

In these types of networked multimedia systems, facsimile documents, digitized voice information, still-motion video or full-motion video frame sequences (each of which is referred to generally as an "information unit") received from a first user and destined for a selected second user are passed from the controller accessed by the first user to the host processor via the LAN. The host processor includes or is connected to a data storage device which is capable of storing all of the data related to all information units transmitted or received by users connected within the system. The host processor sends the information unit to the data storage device where it is stored along with all other information units received by the system. When the information unit is requested by the selected second user, the information unit is again sent over the LAN from the host processor to the local controller accessed by the second user. The host processor, then, is responsible for both storing all data and controlling the flow of data throughout the system.

Because the data files making up the information units are inherently large, often exceeding several megabytes each, the movement of the data to and from the host processor and the storage of data in the system storage device requires significant processing power. The ability of the host processor to receive, send and store the data limits the number of users that can be serviced by the system. In addition, this type of centralized data storage architecture requires that all information units must be moved across the LAN at least twice, once to the host processor for storage and once to a controller for delivery to a selected user, regardless of the location of the first and second user. This two way flow of data necessitates a wide data flow bandwidth within the system.

Accordingly, it is an object of the present invention to provide a multimedia network utilizing a distributable storage architecture which eliminates the need for a centralized storage device for storing all data transmitted or received by users of the system, thereby reducing the required size and power of the network host. It is a further object of the present invention to provide such a network wherein data is efficiently moved within the system only when such data is requested by a user.

Field of the Invention

The present invention relates generally to data communications networks and more particularly to a distributed data storage network wherein data is stored locally in a plurality of local controllers instead of being centrally stored in a host processor.

SUMMARY OF THE INVENTION

A data processing architecture is defined comprising a local area network (LAN) to which are connected (i) a plurality of controllers each of which provides access to any user, and (ii) a host processor which manages all information units and their movement within the system. The information units are locally stored in the controller accessed by the user, and moved only when necessary for delivery to another user. The host processor maintains the status and location of all information units within the system, and performs all administrative functions within the system. The system is controlled by the sending and receiving of control messages between the controllers and the host computer.

The present invention may be used, for example, for facsimile distribution, and is contemplated to overcome present limitations on facsimile machines, e.g., they can only send to one recipient at a time, they cannot provide data privacy, and they cannot defer document transmission until low evening telephone rates are available. Individuals or organizations desiring to use the facsimile distribution system register as valid users with a service provider. Valid users are then able to use all of the system functions for sending facsimile documents to any facsimile machine(s). Functions available to the users include the ability to send a document to multiple facsimile machines simultaneously, the ability to store documents in facsimile mailboxes of other registered users, the ability to have documents stored in a facsimile mailbox until specifically requested, the ability to request that the delivery of a document be deferred until the telephone rates are the lowest or until a specific time and date, and the ability to include a voice annotation with the facsimile document.

The host processor is responsible for managing the system, maintaining user and document directories, maintaining user profiles, performing all information unit routing, and collecting and maintaining billing information related to system use by the individual users. The information units are stored in the controller where they are received from the sender until the host processor determines that it is time for the information unit to be sent over the LAN to a controller (s) for delivery to the proper recipient user(s). The host processor maintains a directory of all information units stored on all of the controllers throughout the system, allowing it to route an information unit to a controller for delivery at a particular time or to a registered user's facsimile machine in response to a mailbox request.

Each of the associated controllers is provided with data storage capacity in the form of local storage in which information units are stored. When an information unit is received, the controller gathers control information related to that information unit. This control information, typically less than 100 bytes, is sent to the host processor from the controller receiving the information unit. The information unit itself (a 5-page facsimile document typically exceeds 50,000 bytes) is stored on the controller where it is received.

After accessing the system via a controller, the user interacts with the controller to request service. The interaction is often via the touch tone buttons of a telephone and voice responses from the controller. Users may request the sending of information units to other users, check the contents of their mailboxes, or request the performing of administrative tasks. The controller interacts with the user until all necessary information is received and then passes the request information to the host processor in a control message. The control message includes such information as the identity of user, the service requested, the destination telephone number or user mailbox identification number for delivery, the type of information unit(s) sent or requested (facsimile document, voice data, video, etc.), delivery instructions, and billing information.

Once the request and any associated information units are received by the system, the host processor will communicate with one or more controllers via control messages to effect the servicing of the request. To service some requests, controllers will send control messages to other controllers. Accordingly, control messages are passed back and forth between controllers and the host processor but information units are passed only between the controllers. Thus, when a user sends an information unit, the information unit is stored in the receiving controller and not in the host processor. The host processor uses the information in the control message to respond to data retrieval or send requests by directing the appropriate first controller to deliver the information unit to the recipient or to send information units stored therein directly to a second controller(s) for delivery to the recipient.

DESCRIPTION OF THE ILLUSTRATIVE EMBODIMENT(S)

System Overview

Figure 1:
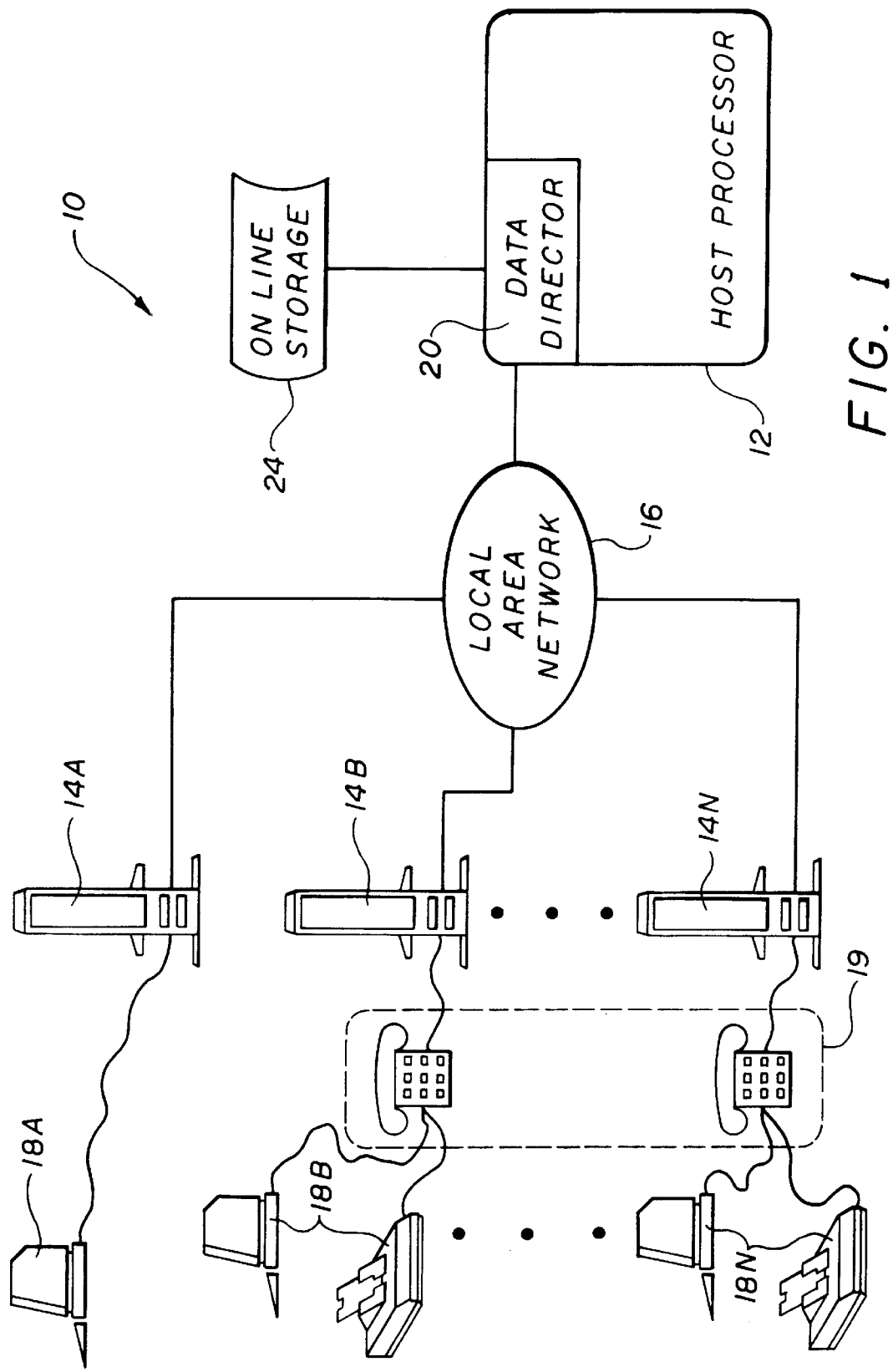
FIG. 1 a schematic diagram of a distributed data storage network constructed according to the principles of the present invention.

Referring to the drawings, FIG. 1 shows a distributed data storage network 10 constructed according to the principles of the present invention. The network 10 comprises a host processor 12 which is connected to a plurality of controllers 14A–14N by means of an interconnect media 16. The controllers 14A–14N in the preferred embodiment are personal computers such as IBM® PS/2 microprocessors, the host processor is an IBM® System/88 (a fault-tolerant data processing system for interactive and batch processing), and the interconnect media takes the form of an IBM® token ring local area network. It is contemplated, however, that the distributed data storage system 10 may be implemented on a smaller scale using less powerful controllers and a less powerful host processor. It is also contemplated that the interconnect media may be a local area network other than a token ring.

System users interface with the controllers 14A–14N either via directly attached input/output (I/O) devices such as personal computers 18A or through a public switched telephone network (PSTN) 19. When attaching through a PSTN, the user employs I/O devices 18B–18N, such as facsimile machines, telephones or personal computers. By means of these user I/O devices, a user can access a controller for inputting identification and set-up information, sending information units to other users' I/O devices, requesting information units which are awaiting delivery to the user, and storing information units in the system.

The host processor 12 includes a central data director 20 provided by software which is responsible for managing the system 10, maintaining user and information unit directories, maintaining user profiles, performing all information unit routing, and maintaining billing information relating to the system use by the individual users. On-line storage 24 is used for storing the user and information unit directories and the billing information. The information units are stored in the controller 14 where they were received until the data director 20 determines that it is time for them to be sent to their recipient user(s). To deliver the information units to the recipient, the data director 20 may determine that they be sent directly from the controller where they are stored or that they should be transferred over the interconnect media 16 to another controller 14 for delivery. The data director 20 is also responsible for monitoring the status of all information units stored on the system, associating information units with the proper user, deleting information units that have been delivered or are no longer needed and providing administrative functions to the users.

Functions of the System Components

The functions necessary to perform the services provided by the system 10 are distributed on the controllers 14 and the host processor 12. The controllers are responsible for (i) interfacing with the user's I/O devices, (ii) requesting necessary identification and setup information from users, (iii) receiving and sending all information units coming into or going out of the system, and (iv) storing all information units handled by the system. The data director 20 of the host processor 12 is responsible for (i) maintaining a directory of all information units within the system including their location, the account number of the user which entered the information, the mailbox(es) to which they are associated, and their status, (ii) maintaining a directory of all users of the system including their account code, password, associated information units, and status, (iii) administration of all information units stored within the system including the deletion of information units when appropriate, (iv) selecting the controller(s) for sending information units from the system to recipient users, and (v) directing controllers to send information units to user's I/O devices, delete information units, or send information units to other controllers.

User Interface

The controller 14A–14N to which a user is attached is responsible for receiving and verifying a user's request information and for receiving any information units. For example, a controller with an audio response capability, accessed by a user with a facsimile machine with a speaker might function as follows:

Controller: "Enter your account code and password"
User: 1234#9999# Controller sends the account code and password to the data director for verification and receives a positive response.
Controller: "Password correct. Press 1 to send an information unit, press 2 to check your mailbox."
User: 1#
Controller: "Enter the telephone number of receiving facsimile machine."
User: 2342345#

By off loading the interaction with users, the host processor is relieved of the need to perform the user request processing.

Information Unit Storage

Information units may be entered into the system via an I/O device 18A–18N such as a telephone, facsimile machine, audio digitizer, or video device. The information units are stored at the controller 14A–14N where they are initially received into the system. For example, if a user enters a facsimile document via 18A which is attached to controller 14A, the document will always be stored on controller 14A. The controller 14A notifies the data director 20 on the host processor 12 that an information unit has been received. The data director 20 updates its directories and system information with the information received from the controller.

Information Unit Control

Although information units are distributed over all controllers, the data director 20 is responsible for all activity related to them. Based on the services provided by the system, the data director 20 may direct a controller 14A–14N to (i) send an information unit to an I/0 device, (ii) delete an information unit, (iii) copy an information unit to another controller, or (iv) retrieve an information unit from another controller. Until receiving instructions from the data director 20, the controller 14 will continue to store the information unit.

Information Unit Routing

The data director is responsible for all routing and delivery of information units stored within the system. Whenever an information unit must be sent to an I/O device 18A–18N, the data director 20 will first attempt to send it from the controller 14A–14N in which it is stored, eliminating the need to ever send it across the interconnect media.

Systems Communications

Controllers 16A–16N and the host processor 12 communicate directly with each other across the interconnect media 16. Two types of data are passed between the components: information units and control messages. Components in the system collectively refer to the controllers 14 and the host processor 12.Control messages are used for passing information or commands from one component to another. Examples of control messages are:

Deliver an Information Unit—requests a controller to deliver an information unit to a recipient or recipients. The host processor selects the controller and the controller selects the port to be used to send the information unit. If a port is not available, the controller will reject the request and return a negative response indicating the reason for the rejection.

Send Data—used to pass an information unit from one component to another.

Verify Parameters—sent by a controller requesting that the host processor 12 verify the parameters specified. Verify Parameter (User) is a special case of Verify Parameter. It requests that the host verify the account code and password of a person attempting to access the system. If the account code and password are valid, the host returns a positive response and other information related to the user such as: the options that are valid for the user along with the number of information units presently stored in the user's mailbox.

Information Unit Request—requests the host to return an information unit or the controller location of the information unit to a requesting user. The controller will then send the information unit to the requester's I/O device.

Forward Information Unit—notifies the host processor that a user has requested that an information unit in his mailbox should be forwarded to other mailboxes and/or I/O devices.

Report Request—requests the host processor 12 to format a report and return it in its response control message. The report may be multiple pages. The end of a page is indicated by the ASCII FF (form feed) character.

Forward Report—notifies the host processor that a user has requested that a report in his mailbox should be forwarded to other mailboxes and/or I/O device.

Modify Profile—requests the host processor 12 to change information in the user's profile. Profile parameters that are not included in this control message should remain unaltered. The user may, for example, add, delete or replace a distribution list or speed dial code. In addition, the user may change default profile values such as password, default confirmation type, automatic forwarding, I/O device, telephone number, or an alternate I/O device telephone number.

Information Request—requests the host processor 12 to return information related to the requested resource, such as mailbox information. The information returned by the host processor includes information unit identifiers of all information units in the mailbox, the address of the controller location of all information units, and whether it is confidential.

End Session—is always sent by the components that started a session, and is used to end the session.

Delete Request—requests the host processor 12 to delete one or more information units from the system. It is sent in response to a request from a user to delete information units in his mailbox. Multiple information unit identifiers may be included in a single Delete Request control message.

Alternate Delivery Request—notifies the host processor that a user has requested an information unit(s) in his mailbox or a report to be sent to an alternate I/O device.

Set Time and Date—requests that the controller set its time and date to the value in the message.

Alert—indicates that the sending component has experienced a fault, either temporary or permanent. Because information units must be protected against controller failure, upon recovery from a failure, a controller must insure that the information unit files are still intact. If not, the controller must immediately send an Alert control message to the host processor 12 indicating that information units were lost.

Heartbeat—indicates that the sending component is functioning properly. It is sent by any controller that has had no communication with the host processor for a predefined (configurable) time.

Start—used to request a controller to start all Applications and service functions, request that an attached network begin interaction with this network, or request that a controller start a port(s).

Restart Controller—requests that the controller reload all Applications, reset the ports, and return to power-on state. The Controller immediately returns a response indicating if the restart can or cannot be performed. It than sends a Alert (started) control message to the host processor 12 when the restart is complete.

Stop—requests that the component stop all ports, Applications and service functions or that a controller stop one or more of its ports. The controller will immediately return a response indicating the status of the requested ports. If one or more are busy, they will be allowed to arrive at a normal completion then they will be stopped and a Alert (all stopped) will be sent to the host processor. The alert will contain a parameter for each port that was specified in the Stop control message. If all requested ports are stopped immediately, no Alert is sent to the host processor. When a controller is stopped (it has received a Stop control message) it will not send Heartbeat control messages and will only accept Start, Restart or Set Time & Date control messages.

Reset—requests that the controller reset one or more of its ports.

Test—requests that the controller test one or more of its ports.

Upload Statistics—requests that the controller upload the statistics it has accumulated since the last statistics reset.

Status of Ports—requests that the controller return the status of all requested ports.

Information Unit Received—a notification by a controller that an information unit has been received.

Copy Information Unit—requests that the controller copy an information unit to another controller or the host processor.

Delete Information Unit—requests that the controller delete an information unit or information units.

Upload Information Unit Status—requests that the controller upload information related to all or selected information units residing there.

Abort—indicates that a procedural error has occurred and the session must be aborted. When any protocol error is detected in an control message sent from another controller or the host processor, the receiving controller will return an Abort control message. If a session has not yet been established, it will be aborted immediately. If an established session is to be prematurely terminated by an Application, it is done by sending an Abort control message containing the session ID and a reason code. If, however, the session is terminated by the user, for example by hanging up the phone, the controller returns an End Session control message with the reason for premature session termination indicated.

Test Link—requests that the recipient return a response control message. No data is passed in this test control message or the response. Its purpose is determine that communication is still possible between the requester and the responder.

Resume Transmitting—indicates that the sender has received a control message and is ready to receive the next control message.

Wait Before Transmitting—indicates that the sending component is overloaded and cannot presently service any further requests. Only priority messages should be sent to the component until a Resume Transmitting control message is received.

A description of the specific control messages which must be supported on the host processor-controller link for a facsimile management system is provided in Appendix A, incorporated by reference herein. Specific examples of control message sequences between controllers 14 and between the host processor and a controller 14 are described in Appendix B, which is also incorporated by reference herein.

Controller Operation

Figure 2:
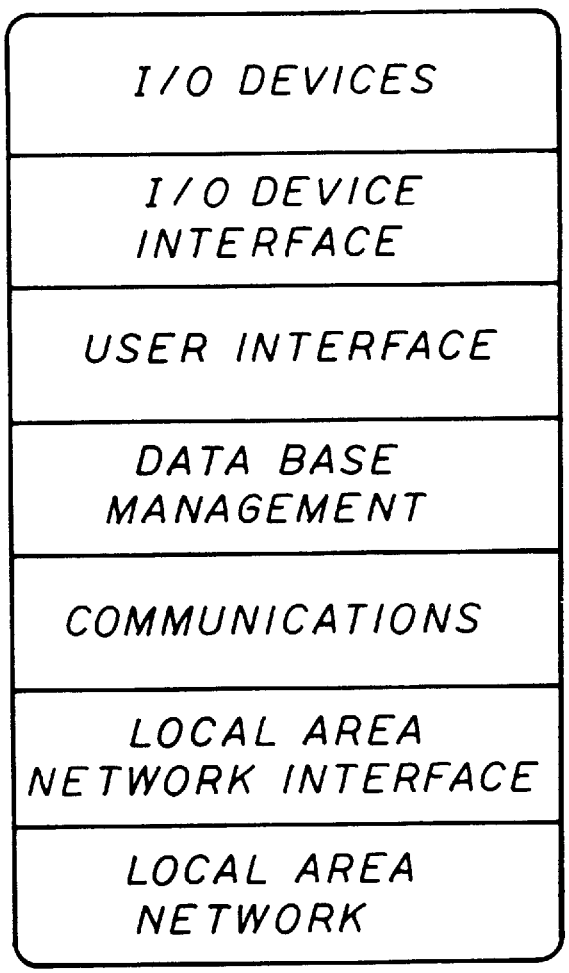
FIG. 2 illustrates the architecture of a controller used in the preferred embodiment.

Each of the associated controllers is provided with data storage capacity in the form of local storage in which information units to be sent and received are stored. As shown in FIG. 2, each controller 14 is provided with a common set of software which provides an interface between the controller and both (i) user I/O devices 18 and (ii) the local area network 16. The functions of the controller 14 include:

message management functions which allow a controller to communicate with any other component within the system;

data management functions which permit a controller to store or retrieve information units, and store a new copy of the configuration file;

remote device management functions which permit a controller to communicate via facsimile, voice, DTMF (Dual Tone Multi-Frequency) or digital protocols to remote I/O devices.

logging and alarm handling functions which allow a controller to log errors, warnings, and informational messages as well as activity information to appropriate logs; and statistics handling functions which allow a controller to update a predefined set of statistical counters and timers.

The controller is also responsible for accomplishing various tasks when communicating with other controllers or the host processor. The following are descriptions of these tasks.

Answer a Call on a DTMF Input Port

This function uses voice prompts and DTMF input to receive account information. The account information is verified by the host processor. Once the account code and password have been verified, the controller will permit the user to send an information unit, deposit an information unit into another user's mailbox, or perform administrative functions.

Process an Information Unit from a User via DTMF Input

This feature allows a user to enter an information unit into the system for distribution to one or more recipients (either I/0 devices or mailboxes). The setup information is entered via touch tone input. The controller sends a Verify Parameter control message to the host processor, builds an Information Unit Received control message and sends it on to the host processor.

Process a Deliver Information Unit Control Message from the Host Processor

This function allows the controller to send an information unit, a non-delivery notice, a rejection notice or a confirmation to a recipient when requested to do so by the host processor.

The host processor 12 sends a Deliver Information Unit control message to the controller, which selects an available port. If all ports are busy, the controller will return a Deliver Information Unit (not delivered) Response control message to the host processor. If the I/O device is available, the status of the port is set, and the information unit is immediately delivered. A positive Deliver Information Unit response control message (including billing information) is sent to the host processor, which sends the controller an End Session control message.

Process a Copy Information Unit Control Message from Another Controller

This function allows a controller to send a file (an information unit(s)) to another controller 14 when requested to do so, by processing a Copy Information Unit control message from another controller. The controller 14 receives the control message, and sends the information unit to the remote controller.

Process a Copy Information Unit Control Message from the Host Processor

This function allows the host processor to request the controller 14 to send a file (information units(s)), to another controller, by processing a Copy Information Unit control message from the host processor. The controller 14 receives the control message and sends the file or information unit to the component requested by the host processor 12 via a Send Data control message, and sends a Copy Information unit response control message to the host processor.

Send an Alert Control Message to the Host Processor

This function allows the controller to send an Alert control message to the host processor to indicate that a fault or abnormal event has occurred at the controller. This function is invoked if the controller detects an abnormal hardware or software condition or a failure.

Send a Heartbeat Control Message to the Host Processor

This function allows the controller to send a Heartbeat control message to the host processor 12 to indicate that the controller is still functioning properly, if there have been no control messages sent to the host processor for a predetermined time period. The controller monitors for expiration of this time period. If time period expires, the controller sends a Heartbeat control message to the host processor.

Host Processor Operation

The host processor 12 includes the data director 20, with which the controllers 14A–14N communicate directly over the LAN 16. The data director 20 maintains a directory indicating the location of all of the information units in the network. The data director 20 also controls the deletion of information units when directed by a user, and further controls the movement of information units throughout the network.

The interaction of the users with the controllers 14 results in requests for service. The controllers convert these requests to control messages and pass the control messages to the data director 20. The data director manages the requests using the data in the messages. The data includes such information as the identity of the controller 14, the size of the information unit, and the time at which the information unit was received and stored by the controller.

Control messages are passed from the data director to the controllers to service a request. Based on control messages received from the data director, a controller 14 may send control messages and/or information units directly to another controller. Accordingly, control messages are passed back and forth between controllers 14 and the data director 20, and information units are passed back and forth between the controllers.

Thus, when a user sends an information unit, this information unit is stored in the controller 14 and not in the host processor. Included with the information unit are instructions identifying the intended recipient of the information unit. The data director is notified that an information unit has been received and stored and is intended for a particular recipient. The data director selects a second controller (or the same controller) to deliver the information unit and notifies the controller 14 that an information unit is waiting for it in the first controller. The second controller then requests the information unit from the first controller and delivers it to the recipient.

The host processor is responsible for accomplishing various tasks when communicating with controllers in the system. Following are descriptions of these tasks.

Process an Information Unit Received Control Message from a Controller

This function processes an Information Unit Received control message from a controller. Depending on the destinations and the setup options requested by the user, the following may occur. If deferred delivery was requested, the information unit is flagged as pending delivery and is added to the deferred delivery list for later delivery. If priority delivery was requested, a Deliver Information Unit control message is sent to a controller with a priority flag set. If the controller does not have an available port, it will return a negative response. If no special handling is requested, a Deliver Information Unit control message is sent to one or more of the controllers.

Process an Information Unit Requested Control Message from a Controller

This function processes an Information Unit Requested control message from a controller. Depending on the type of information unit requested by the user, the following may occur. If this is a mailbox request and it is for multiple information units, a Deliver Information Unit (Multiple) control message is sent to a controller. Otherwise, a Deliver Information Unit control message is sent to a controller.

Process a Forward Information Unit Control Message from a Controller

This function processes a Forward Information Unit control message from a controller. Depending on the request, one or the following will occur. If this is a request to forward a mailbox information unit(s) to another mailbox, the recipient's mailbox information will be updated to include the information units(s). If this is a request to forward a mailbox information unit to an I/O device, a Deliver Information Unit control message will be sent to a controller. If this is a request to forward multiple mailbox information units to an I/O device, a Deliver Information Unit (multiple) control message will be sent to a controller.

Process an Information Unit Delivered Control Message from a Controller

This function processes an Information Unit Delivered control message received from a controller. Depending upon the type of information unit, the following may occur. For an information unit, the user profile is updated, and the copy count for this information unit is decremented. A record is added to the transaction (billing) file. If this is the last copy to be delivered, the information unit is removed from the information unit queue, a Delete Information Unit control message is sent to the controller(s) storing the information unit, and a confirmation message is sent to the user. A record is added to the transaction (billing) file.

Process an Information Unit Not Delivered Control Message from a Controller

This function processes an Information Unit Not Delivered control message received from a controller. Depending upon the type of error that occurred, the following may occur: the delivery may be retried, the delivery may be aborted, or the delivery may be deferred and tried later.

Process a Verify Parameter Control Message from a Controller

This function processes a Verify Parameter control message from a controller. The parameters which may be verified are: account number and password (User), distribution list identifier, or information unit identifier. The response from the host processor 12 indicates whether or not the parameter is valid.

Process a Heartbeat Control Message from a Controller

This function processes a Heartbeat control message from a controller. The host processor receives a Heartbeat control message from the controller, and resets the no-response timer for this controller.

Process No Heartbeat from a Controller

This function processes a lost controller (no heartbeat) condition. If the host processor 12 receives a no-response timer expiration, it determines the controller address, and sends a Status control message to the controller. If there is still no response, it begins to perform necessary recovery functions.

Process an Alert Control Message from a Controller

This function processes an Alert control message from a controller. The host processor receives an Alert control message. It obtains the text for the alert, and then performs necessary recovery functions.

Accordingly, the preferred embodiment for a system and method for distributed data storage in a data communications network has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method for minimizing the transfer of data in a networked distributed data processing system having a network host, the method comprising the steps of:

(a) uploading an information unit to a sending controller device for direct transmission to a receiving controller device;

(b) temporarily storing an information unit in a sending controller device until the sending controller device is directed to directly transfer the information unit to a receiving controller device;

(c) controlling the direct transmission of an information unit between a sending and a receiving controller device, wherein the step of controlling the direct transmission of an information unit between a sending and a receiving controller device comprises the steps of:

(1) after an information unit has been uploaded to a sending controller device, sending a control message from the sending controller device to a data director without sending the information unit to the data director or network host;

(2) associating an information unit with a sending and a receiving controller device;

(3) sending a control message from a data director to a receiving controller device to indicate that a sending controller has an information unit which has been associated with the receiving controller device;

(4) sending a request for an information unit from a receiving controller device directly to a sending controller device; and (5) sending an information unit from a sending controller device directly to a receiving controller device to thereby avoid transmission of an information unit to a host or data director in the network.

2. The method of claim 1 wherein the step of sending a control message from the sending controller device to a data director without sending the information to a data director or network host comprises the step of sending an information unit received control message to a data director to indicate that an information unit has been uploaded.

3. The method of claim 1 wherein the sending an information unit from a sending controller device directly to a receiving controller device to thereby avoid transmission of an information unit to a host or data director in the network includes the step of selecting a communication port for sending the information unit directly to the receiving controller device.

4. The method of claim 3 wherein the step of sending an information unit from a sending controller device directly to a receiving controller device to thereby avoid transmission of an information unit to a host or data director in the network further includes the step of sending a communication port not available control message from the sending controller device to the receiving controller device to indicate that a communication port was not available for sending of an information unit.

5. The method of claim 4 wherein the step of sending an information unit from a sending controller device directly to a receiving controller device to thereby avoid transmission of an information unit to a host or data director in the network further includes the step of sending an information unit not delivered control message from the sending controller device to the host or data director to indicate an information unit was not delivered to a receiving controller device.

6. The method of claim 1 wherein the step of temporarily storing an information unit in a sending controller device until the sending controller device is directed to directly transfer the information unit to a receiving controller device includes the step of temporarily storing video data.

7. The method of claim 1 wherein the step of temporarily storing an information unit in a sending controller device until the sending controller device is directed to directly transfer the information unit to a receiving controller device includes the step of temporarily storing audio data.

8. The method of claim 1 wherein the step of temporarily storing an information unit in a sending controller device until the sending controller device is directed to directly transfer the information unit to a receiving controller device includes the step of temporarily storing textual data.

9. A method for minimizing the transfer of data in a networked distributed data processing system having a network host, the method comprising the steps of:

(a) uploading a plurality of information units to a plurality of sending controller devices for direct transmission to a plurality of receiving controller devices;

(b) temporarily storing the plurality of information units in the plurality of sending controller devices until the plurality of sending controller devices are directed to directly transfer the plurality of information units to a plurality of receiving controller devices;

(c) controlling the direct transmission of a plurality of information units between a plurality of sending and a plurality of receiving controller devices, wherein the step of controlling the direct transmission of a plurality of information units between a plurality of sending and a plurality of receiving controller devices comprises the steps of:

(1) as an information unit is uploaded to a sending controller device, sending a control message from the sending controller device to a data director without sending the information unit to a network host or data director;

(2) associating an information unit with a sending and a receiving controller device;

(3) sending a control message from a data director to a receiving controller device to indicate that a sending controller has an information unit which has been associated with the receiving controller device;

(4) sending a request for an information unit from a receiving controller device directly to a sending controller device; and (5) sending an information unit from a sending controller device directly to a receiving controller device to thereby avoid transmission of an information unit to a host or data director in the network.

10. The method of claim 9 wherein the step of sending an information unit from a sending controller device directly to a receiving controller device to thereby avoid transmission of an information unit to a host or data director in the network includes the step of sending video, audio, textual or any combination of the foregoing, data.

11. A networked distributed data processing system comprising:

(a) a host having a data director for receiving and transmitting control messages to at least a first and a second controller device;

(b) an interconnect media for
  (1) transmitting control messages:
    a. directly between the host and the first controller device;
    b. directly between the host and the second controller device; and
    c. directly between the first controller device and the second controller device; and for
  (2) transmitting information units directly between the first and the second controller devices;

(c) the first controller device comprising:
  (1) a local storage for storing at least one information unit;
  (2) communication logic for transmitting at least one information unit directly to the second controller device without transmitting the at least one information unit to the host;
  (3) communication logic for receiving at least one information unit directly from the second controller device; and
  (4) communication logic for sending and receiving control messages directly from the second controller device;

(d) the second controller device comprising:
  (1) a local storage for storing at least one information unit;
  (2) communication logic for transmitting at least one information unit directly to the first controller device without transmitting the at least one information unit to the host;
  (3) communication logic for receiving at least one information unit directly from the first controller device; and
  (4) communication logic for sending and receiving control messages directly from the first controller device.

12. The data processing system of claim 11 further including a plurality of controller devices, each comprising:
  (a) a local storage for storing at least one information unit;
  (b) communication logic for transmitting at least one information unit directly to the any one other controller device without transmitting the at least one information unit to the host; and
  (c) communication logic for receiving at least one information unit directly from any other controller device.

13. The data processing system of claim 11 further comprising a first user input/output device associated with the first controller device and for transmitting and receiving at least one information unit to and from the first controller device.

14. The data processing system of claim 11 further comprising a second user input/output device associated with the second controller device and for transmitting and receiving at least one information unit to and from the second controller device.

15. The data processing system of claim 11 wherein the host further includes a storage device for storing:
  (a) user billing information;
  (b) controller device contents; and
  (c) status of each information unit in each controller.

16. The data processing system of claim 11 wherein the at least one information unit comprises video, audio, textual or combinations of the foregoing types of data.

17. The data processing system of claim 11 wherein the interconnect media is a local area network.

* * * * *